United States Patent [19]
Bullivant et al.

[11] Patent Number: 5,454,524
[45] Date of Patent: Oct. 3, 1995

[54] MATERIAL FEEDING APPARATUS

[75] Inventors: Kenneth W. Bullivant, Chadds Ford, Pa.; Ingo G. Holzmann, Dreieich; Roland Koetter, Bad Vilbel, both of Germany

[73] Assignee: K-Tron Technologies, Inc., Wilmington, Del.

[21] Appl. No.: 249,539

[22] Filed: May 26, 1994

Related U.S. Application Data

[63] Continuation-in-part of Ser. No. 224,954, Apr. 8, 1994, abandoned.
[51] Int. Cl.$^6$ .................................................. B02C 18/00
[52] U.S. Cl. ..................... 241/242; 241/225; 222/342; 222/410
[58] Field of Search ................... 241/36, 242, 224, 241/225, 237, 239; 222/135, 142, 145, 342, 345, 367, 370, 410

[56] References Cited

U.S. PATENT DOCUMENTS

| 1,566,187 | 12/1925 | Fifer | 222/370 X |
|---|---|---|---|
| 3,788,529 | 1/1974 | Christy | 222/342 X |
| 4,067,483 | 1/1978 | Müche | 222/342 X |
| 4,480,948 | 11/1984 | Dreyer | 222/342 X |
| 4,627,555 | 12/1986 | Locke | 222/342 X |

FOREIGN PATENT DOCUMENTS

| 1320793 | 2/1963 | France | 222/342 |
|---|---|---|---|
| 1138269 | 10/1962 | Germany | 222/342 |

OTHER PUBLICATIONS

"Digital volumetric dosing and blending: Reliable product quality due to the exact monitoring of recipe," product information brochure published by Colortronic GmbH 10 page sides, (Sep. 1992).
"Model CDK-250—Low Range Metering and Blending Unit"—product information brochure published by K-Tron Colortronic, 4 page sides, (date unknown).

*Primary Examiner*—Timothy V. Eley
*Attorney, Agent, or Firm*—Ratner & Prestia

[57] ABSTRACT

A disc feeder for delivering material in controlled amounts to utilization equipment. The disc which carries material to a material discharge opening is disposed at an angle to the horizontal and the shearing baffle which controls the amount of material carried to the material discharge opening is movable from its position during normal operation to a position remote from the disc, whereby during unloading of the storage hopper the material discharges freely and quickly to a storage container. A control valve selectively directs material to one delivery conduit which leads to the utilization equipment and a second delivery conduit which leads to the storage container. The apparatus has an interlock mechanism which prevents moving the shearing baffle while material is being conducted to the utilization equipment and prevents moving the control valve to direct material to the utilization equipment while the shearing baffle is at its remote position.

22 Claims, 5 Drawing Sheets

MATERIAL FEEDING APPARATUS

This application is a continuation-in-part of pending U.S. patent application Ser. No. 08/224,954, filed Apr. 8, 1994.

BACKGROUND OF THE INVENTION

The present invention relates, in general, to materials handling and, in particular, to materials feeding apparatus which delivers controlled amounts of free flowing solid materials to utilization equipment.

There are a number of different types of equipment for feeding free flowing solid materials such as granulated materials, powders, pellets and the like. In one form, known as a "disc" feeder and used commonly for handling granulated material, the material is carried on a horizontally disposed rotating disc. The material passes under a shearing baffle which is set at a height to control the amount of material which is delivered to a material discharge point. At the material discharge point, the material is conducted through chutes and conduits to the utilization equipment.

The disc feeder can be arranged with a disc having a flat top surface on which the material is carried and suitable means for conducting the material from the top of the disc to the utilization equipment after the material has passed under the shearing baffle and reached the material discharge point. Alternatively, the disc can have through holes in which the material is carried and which are closed off at their bottoms by a base over which the disc rotates. The material discharge point is an opening in the base through which the material carried in the through holes is free to fall when the respective through holes clear the base and reach this opening.

A common application of disc feeders is for feeding coloring additives, in the form of granulated material, to an injection molding machine to which the base component of the part to be molded also is supplied. Besides the requirement that such feeders deliver accurately metered quantities of materials regardless of the form of the feeder or its application, such feeders also should be arranged for easy changeover when the material to be delivered to the utilization equipment is to be changed. In addition, such feeders should be relatively easy to disassemble and reassemble when it is necessary to clean or repair the feeder.

Disc feeders which are currently available, while capable of delivering accurately metered quantities of the material being handled, are not arranged for easy changeover of materials to be handled. Typically, the storage hopper, still containing material, along with the disc and associated components is lifted off the base of the apparatus as a unit and the material in the loader hopper is dumped into a storage container. This can be awkward and difficult because of the bulkiness of the equipment and the weight of the equipment and the material in the storage hopper.

SUMMARY OF THE INVENTION

Materials feeding apparatus for delivering material to utilization equipment, constructed in accordance with the present invention, includes a storage hopper in which material is stored and which has a floor with a material discharge opening extending through the floor. Also included in this materials feeding apparatus is a disc unit positioned within the storage hopper above the material discharge opening in the floor of the storage hopper and mounted for rotation in a plane at an angle to the horizontal for carrying material in the storage hopper to the material discharge opening. Drive means for imparting rotation to the disc unit also are included in this materials feeding apparatus. A shearing baffle is positioned above the disc unit at a predetermined distance from the disc unit for controlling the amount of material passing beneath the shearing baffle and carried by the disc unit to the material discharge opening in the floor of the storage hopper. The shearing baffle is mounted for movement to a position remote from the disc unit. This materials feeding apparatus further includes positioning means for moving the shearing baffle between the remote position of the shearing baffle and the position of the shearing baffle a predetermined distance from the disc unit. A first delivery conduit conducts material passing through the material discharge opening in the floor of the storage hopper to the utilization equipment. A second delivery conduit conducts material passing through the material discharge opening in the floor of the storage hopper to a storage container. Control valve means for selectively connecting the first and the second delivery conduits to the material discharge opening in the floor of the storage hopper also are included in this materials feeding apparatus. In accordance with a second aspect of the present invention, the materials feeding apparatus described above is combined with a second feeder, which delivers a second material, to form a materials blender.

DETAILED DESCRIPTION OF THE INVENTION

Figure 1:
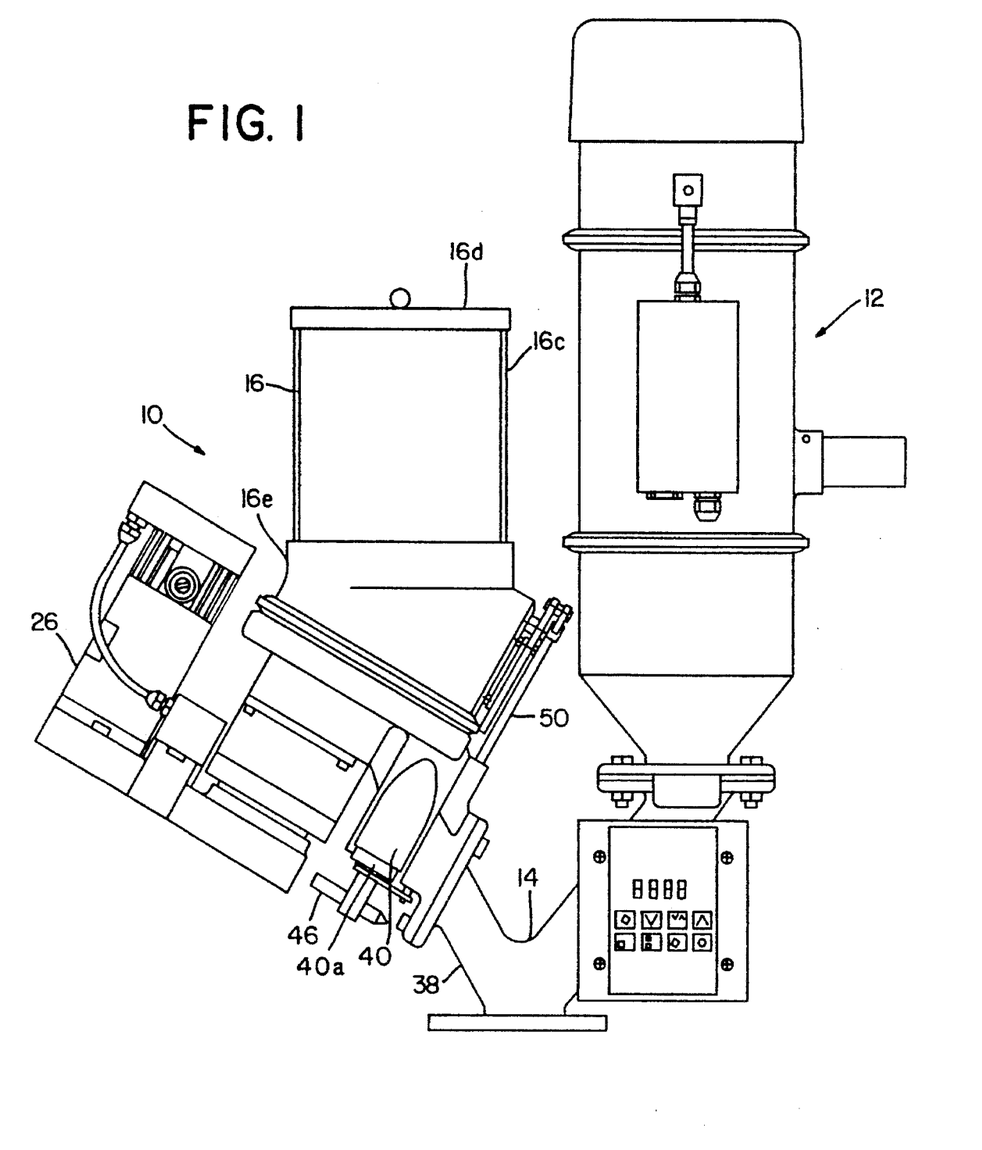
FIG. 1 is a front view, partially in section, of a preferred embodiment of a materials blender constructed in accordance with the present invention.

Referring to FIG. 1, a materials blender, constructed in accordance with the present invention, includes a first materials feeder 10 for delivering a first constituent material of a blend and a second materials feeder 12 for delivering a second constituent material of the blend. The first constituent material can be, for example, a coloring additive which is combined with the second constituent material, namely a base material, and the two constituent materials are conducted, by means of a Y-junction 14, to utilization equipment, for example an injection molder, which is not shown.

Materials feeder 12 can be a volumetric feeder of conventional construction and operation. The construction and operation of materials feeder 10 is described in detail below in conjunction with all of the figures.

Figure 2:
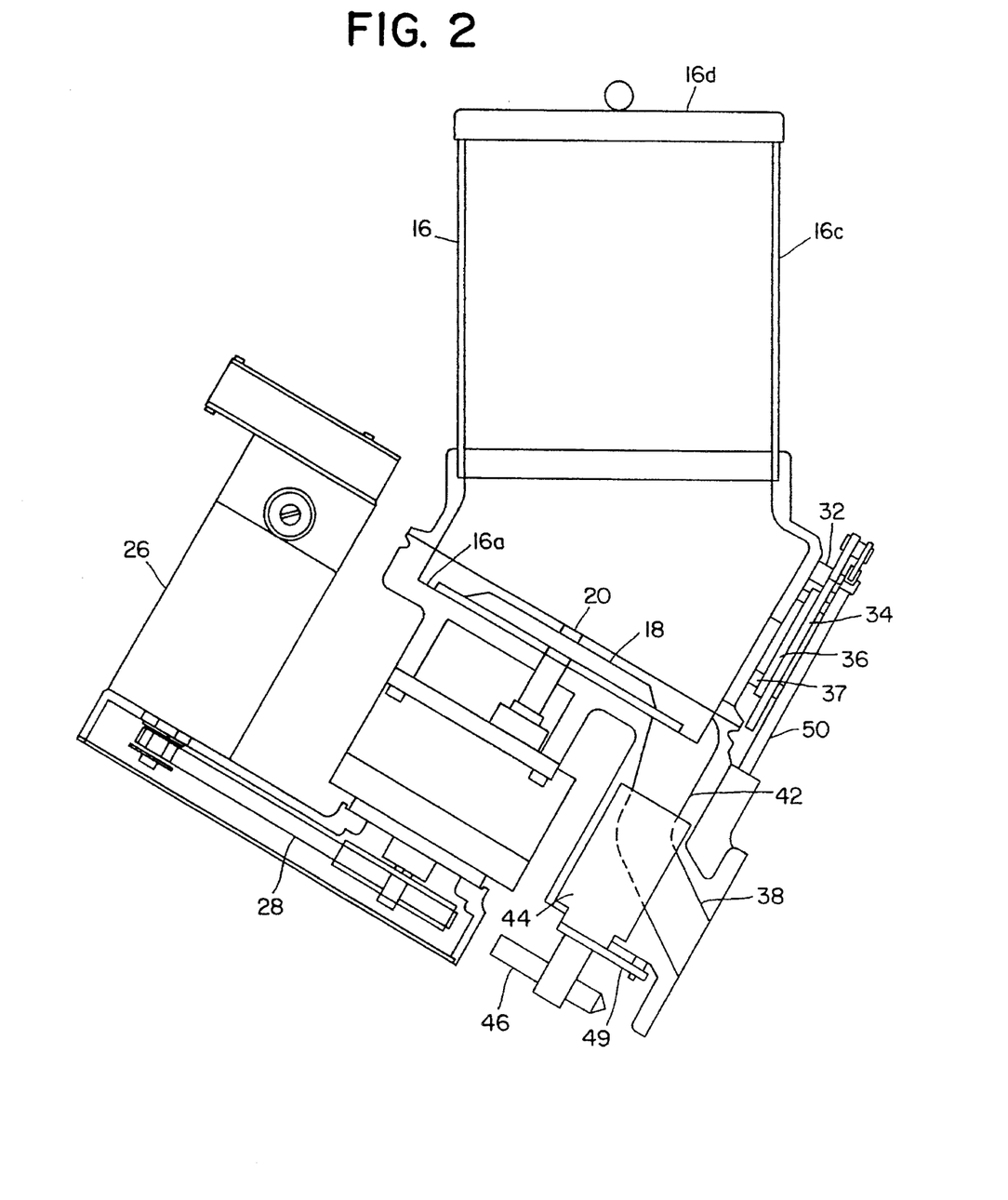
FIG. 2 is a vertical sectional view, taken from the front, of a preferred embodiment of a materials feeding apparatus constructed in accordance with the present invention.
Figure 3:
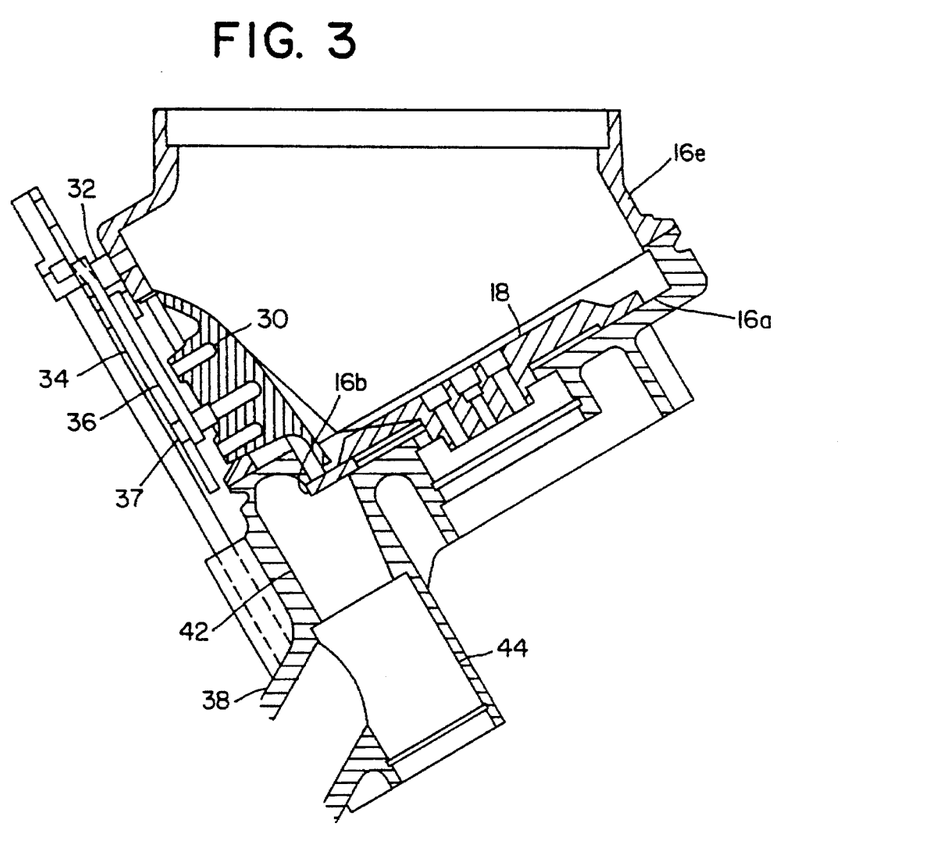
FIG. 3 is s a vertical sectional view, taken from the rear, of a portion of the FIG. 2 materials feeding apparatus.

Referring to FIGS. 1, 2 and 3, materials feeding apparatus 10 for delivering material to utilization equipment, constructed in accordance with the present invention, includes a storage hopper 16 in which material is stored. Storage hopper 16 has a floor 16a with a material discharge opening 16b extending through the floor, a vertical cylindrical top section 16c and a cover 16d which covers the opening at the top of the storage hopper through which material is loaded into the storage hopper. For the embodiment of the invention being described, floor 16a of storage hopper 16 is disposed at an angle to the horizontal and material discharge opening 16b in the floor of the storage hopper is at the lowest point of the floor. Storage hopper 16 also has a transition section 16e which effects a transition between the vertical cylindrical top section 16c and the angularly disposed floor 16a.

A disc unit 18 is positioned within storage hopper 16 above material discharge opening 16b in floor 16a of the storage hopper. Disc unit 18 is mounted for rotation about an axis defined by a spindle 20 in a plane at the same angle to the horizontal as the angular disposition of floor 16a of storage hopper 16. Disc unit 18 serves to carry material in storage hopper 16 to material discharge opening 16b.

Figure 4:
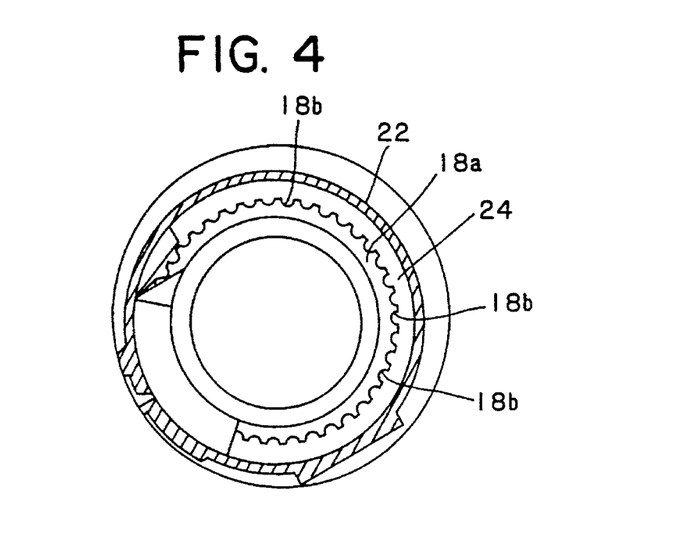
FIG. 4 is a top sectional view of the disc unit of the FIGS. 2 and 3 materials feeding apparatus.

As shown in FIG. 4, for the embodiment of the invention being described, disc unit 18 includes a disc 18a having cavities 18b extending through the thickness thereof and within which material in storage hopper 16 is carried to material discharge opening 16b of storage hopper 16. An outer peripheral wall 22, secured to floor 16a of storage hopper 16, surrounds disc 18a. Cavities 18b of disc 18 are spaced from wall 22 and open into the space 24 between the disc and the wall. With this arrangement of disc unit 18, cavities 18b fill with material in storage hopper 16 from the edge of the cavities and from the top of the cavities.

A first alternative arrangement of disc unit 18 is to eliminate space 24 so that the outer edges of the open cavities are against outer peripheral wall 22. With such an arrangement of disc unit 18, cavities 18b fill with material in storage hopper 16 only from the top of the cavities.

A second alternative arrangement of disc unit 18 is closed cavities within the confines of disc 18a. With such an arrangement of disc unit 18, cavities 18b fill with material in storage hopper 16 only from the top of the cavities and outer peripheral wall 22 can be eliminated.

Drive means, in the form of a motor 26, a belt drive 28, and other suitable components (e.g. gearing) impart rotation to spindle 20 and disc unit 18.

A shearing baffle 30, shown in FIG. 3, is positioned above disc unit 18 at a predetermined distance from the disc unit for controlling the amount of material passing beneath the shearing baffle and carried by the disc unit to material discharge opening 16b in floor 16a of storage hopper 16. This position of shearing baffle 30 is referred to as the "DOWN" position of the shearing baffle. Material carried by disc 18 at a level above shearing baffle 30 moves up the ramp of the shearing baffle and returns into the mass of material in storage hopper 16. In addition, shearing baffle 30 is arranged to shear material which tends to wedge or get stuck in movement as the material encounters the shearing baffle. Shearing baffle 30 is mounted for movement between its DOWN position and a position remote from disc unit 18 which is referred to as the "UP" position of the shearing baffle.

Referring to FIGS. 2, 3, 5A, and 5B, movement of shearing baffle 30 between its DOWN and UP positions is accomplished by means of a toggle-lever mechanism which includes a pivot pin 32, a lever arm 34, a link 36, and a stud 37. Lever arm 34 pivots about pivot pin 32 which is attached to storage hopper 16. Link 36 is attached at one end to lever arm 34 for relative rotational movement between the lever arm and the link and at its opposite end to shearing baffle 30 by means of a stud 37 which extends through storage hopper 16. As lever arm 34 is lifted from the position shown in FIG. 5A to the position shown in FIG. 5B, shearing baffle 30 moves upward. This is indicated by the relative positions of stud 37 and storage hopper 16 in FIGS. 5A and 5B. A downward movement of lever arm 34 returns shearing baffle 30 to its DOWN position. It is particularly important that the means by which shearing baffle 30 is moved between the DOWN and UP positions be able to withstand the forces to which the shearing baffle is exposed when material tends to wedge or get stuck in movement as the material encounters the shearing baffle. As will be explained hereinafter, shearing baffle 30 is moved to its UP position to permit free and quick discharge of the material in storage hopper 16 when the storage hopper is to be unloaded.

Referring again to FIGS. 1, 2 and 3, materials feeding apparatus, constructed in accordance with the present invention, also includes a first delivery conduit 38 for conducting material passing through material discharge opening 16b in floor 16a of storage hopper 16 to the utilization equipment, which is not shown, and a second delivery conduit 40 for conducting material passing through the material drop-off opening in the floor of the storage hopper to a storage container, also not shown. Delivery conduit 38 conducts material from storage hopper 16 when the materials feeding apparatus is "on-line" to deliver material to the utilization equipment and delivery conduit 40 conducts material from the storage hopper when the materials feeding apparatus is "off-line" to deliver material to the storage container during unloading of the storage hopper or calibration of the apparatus. The lower end 40a of delivery conduit 40 is arranged to receive a hose which is clamped to this delivery conduit during discharge of material to the storage container.

As shown in FIGS. 1, 2 and 3, materials feeding apparatus, constructed in accordance with the present invention, further includes valve means for selectively connecting delivery conduits 38 and 40 to material discharge opening 16b in floor 16a of storage hopper 16. Such valve means include, for the embodiment of the invention being described, a discharge chute 42, a control valve 44, and a handle 46 by which the control valve is selectively switched between its two positions.

Figure 5A:
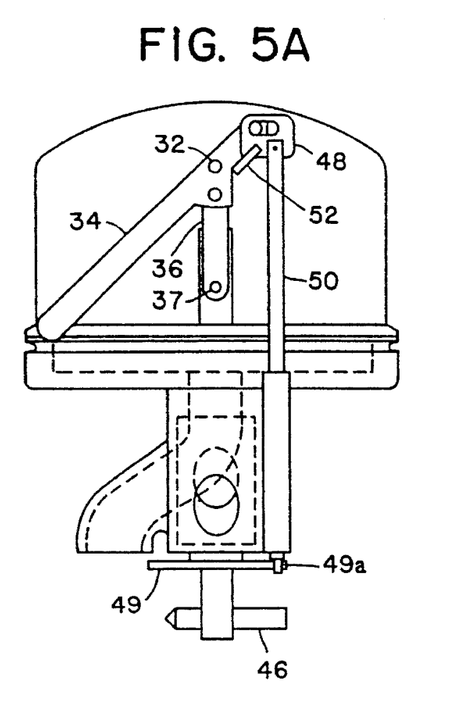
FIGS. 5A, 5B and 5C show a portion of a shearing baffle positioning and interlock mechanism used in the FIGS. 2 and 3 materials feeding apparatus.
Figure 5B:
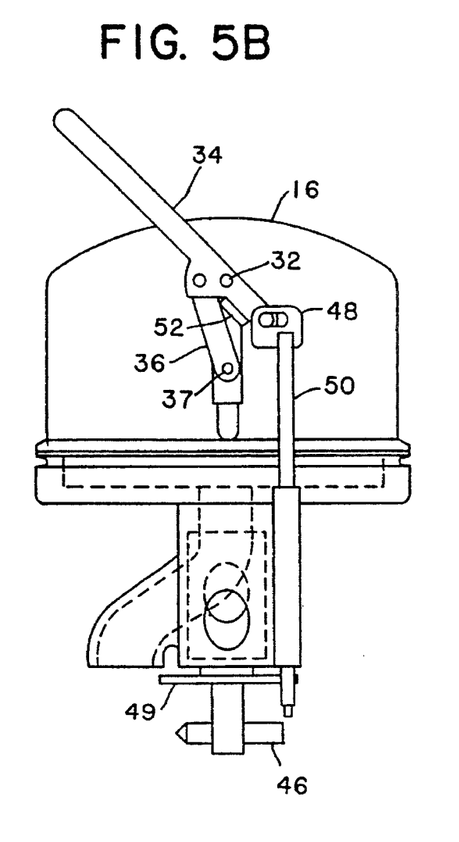
Figure 5C:
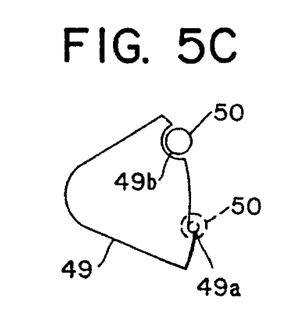

Material feeding apparatus, constructed in accordance with the present invention, preferably has interlocking means extending between control valve 44 and the toggle-lever mechanism by which shearing baffle 30 is moved for: (a) preventing movement of the shearing baffle from its DOWN position to its UP position while control valve 44 connects delivery conduit 38 to material discharge opening 16b in floor 16a of storage hopper 16, and (b) preventing the control valve from connecting delivery conduit 38 to the material discharge opening while the shearing baffle is in its UP position. As shown in FIGS. 5A, 5B and 5C, such interlock means include, for the embodiment of the invention being described, a retainer plate 48, a control plate 49 fixed to and movable with valve 44, a rod 50 having one end attached to retainer plate 48 with the other end which is stepped engaging control plate 49, and a finger 52 fixed to and movable with lever arm 34.

With shearing baffle 30 in its DOWN position as shown by FIG. 5A, the shoulder of the stepped lower end of rod 50 rests on the top of control plate 49, while the reduced diameter point end of the rod extends through the control plate and engages the control plate in a notch 49a. This condition also is shown by the dashed lines in the FIG. 5C top view of control plate 49. In this position, rod 50 is prevented from moving downward which, in turn, prevents upward movement of lever arm 34, so that shearing baffle 30 is prevented from moving to its UP position. When, however, control valve 44 is turned to connect delivery conduit 40 to material discharge opening 16*b* in floor 16*a* of storage hopper 16, control plate 49, which is fixed to the control valve, turns with the control valve so that a notch 49*b* in the control plate is below rod 50 and the larger diameter of the rod now is free to move downward. This condition is shown in the FIG. 5C top view of control plate 49 by the solid line rod 50. With rod 50 free to move downward, lever arm 34, coupled to the rod, can be moved upward and shearing baffle 30 can be moved from its DOWN position to its UP position.

While rod 50 is in notch 49*b* of control plate 49, the control plate cannot be turned from this position. This, in turn, prevents turning control valve 44, so that the control valve is prevented from connecting delivery conduit 38 to the material discharge opening while shearing baffle 30 is in its UP position.

Besides serving as an interlock component, rod 50 also serves as a stop which is engaged by control plate 49 to limit the turning movement of control valve 44. For one end position of control valve 44 and control plate 49, the control plate abuts against the reduced diameter point end of rod 50, while for the other end position of the control valve and the control plate, the control plate abuts against the larger diameter section of the rod.

In normal "on-line" operation of the materials feeding apparatus, disc 18*a* rotates and material in storage hopper 16 is carried in cavities 18*b* under shearing baffle 30, which is in its DOWN position, to material discharge opening 16*b* in floor 16*a* of storage hopper 16. Material which is delivered to material discharge opening 16*b* drops down through discharge chute 42. With control valve 44 in the "on-line" position, the material passes through the control valve and delivery conduit 38 to the utilization equipment.

When the material in storage hopper 16 is to be changed, control valve 44 is switched to the "off-line" position. Control plate 49 turns with control valve 44 to the position at which rod 50 is free to move downward when lever arm 34 and shearing baffle 30 are moved upward. Control valve 44 is locked in the "off-line" position by the engagement of rod 50 with control plate 49 when the rod moves downward into notch 49*b* of the control plate. When disc 18*a* is rotated with shearing baffle 30 in its UP position, material in storage hopper 16, drawn by gravity to the lowest point in the storage hopper, drops freely and quickly through material discharge opening 16*b* in floor 16*a* of the storage hopper. The material passes through discharge chute 42 and is directed by control valve 44 to delivery conduit 40 and a storage container. In this manner, storage hopper 16 is unloaded without the need for lifting it off the base of the feeder to dump the contents in a storage container. Also, cleaning storage hopper 16 with high-pressure air is facilitated by having a low point in the storage hopper to which residue in the storage hopper tends to move.

With lever arm 34 up, finger 52 is clear of retainer plate 48 and rod 50 can be turned about its axis and the lever arm can move off pivot pin 32. After all the material has been removed from storage hopper 16, upper section 16*c* of the storage hopper and disc unit 18 can be removed.

The materials feeding apparatus can be calibrated by rotating disc 18*a* to carry material under shearing baffle 30 to material discharge opening 16*b* in floor 16*a* of storage hopper 16 while control valve 44 is in the "off-line" position, so that material passes through discharge chute 42, the control valve and delivery conduit 40 to a storage container.

In an alternative preferred embodiment of the present invention, a third position for control valve 44 is added. When control valve 44 is in this third position, no material is discharged from storage hopper 16. In this embodiment of the present invention, the operator of the materials feeding apparatus must undertake a deliberate procedure to move shearing baffle 30 to its UP position to unload material from storage hopper 16. This procedure prevents accidental lifting of lever arm 34 and unintended movement of shearing baffle 30 to its UP position when control valve 44 has been switched to the "off-line" position for calibration of the apparatus. Otherwise, even the slightest upward movement of shearing baffle 30 could necessitate unloading the entire contents of storage hopper 16 before the shearing baffle could be returned to its DOWN position because there could be material beneath the shearing baffle which would block the downward movement of the shearing baffle to its DOWN position. In addition, this alternative embodiment of the present invention locks shearing baffle 30 in its UP position while material from storage hopper 16 is being unloaded.

Figure 6A:
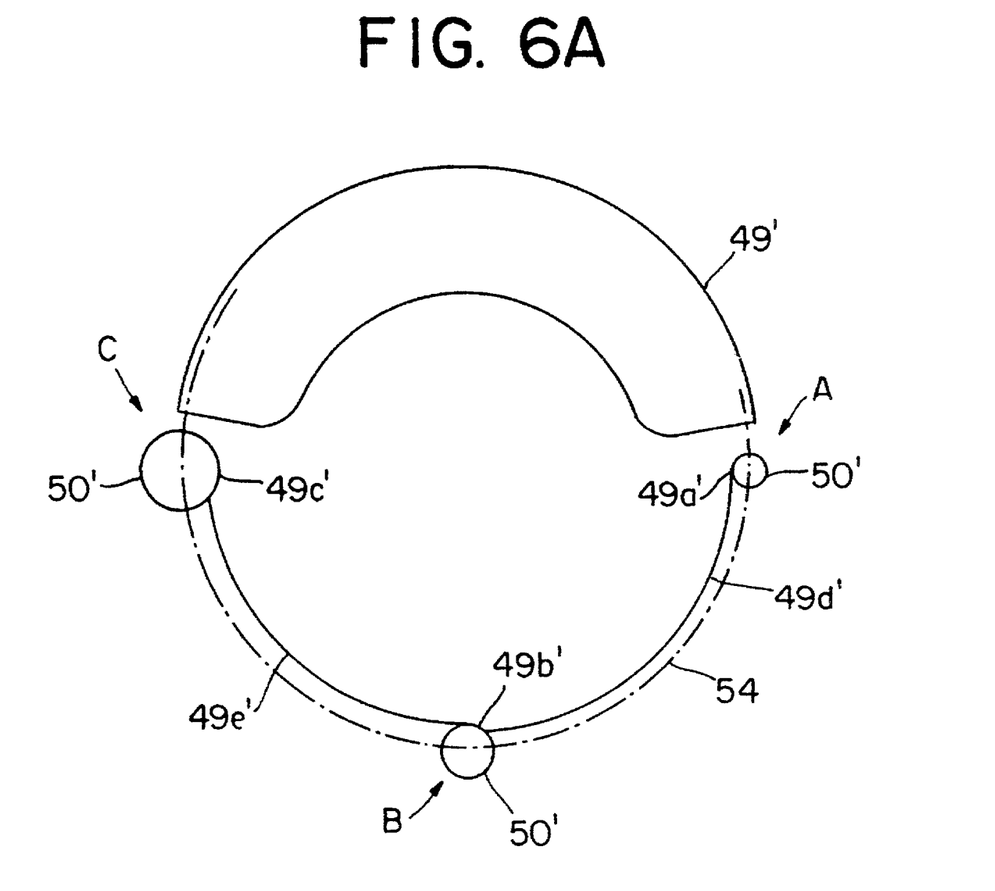
FIGS. 6A and 6B show two parts of a modified shearing baffle positioning and interlock mechanism.
Figure 6B:
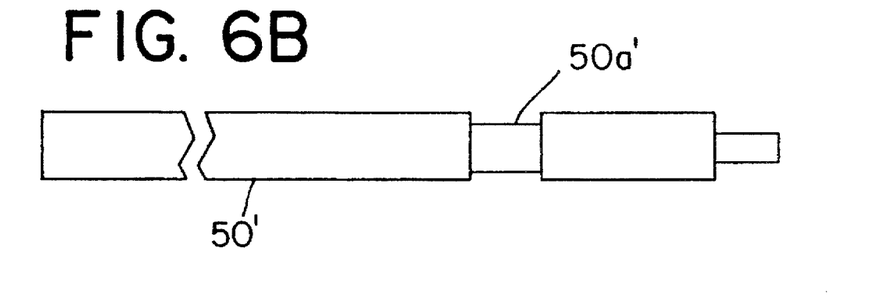

FIGS. 6A and 6B are top and side views, respectively, of a modified control plate 49' and a modified rod 50' which are parts of the interlocking means which prevent unintended upward movement of shearing baffle 30. Rod 50' is generally the same as rod 50 except that rod 50' has a circumferential groove 50*a'* with a reduced diameter greater than the diameter of the point end of the rod and less than the larger diameter of the rod. In contrast to control plate 49, which is formed to engage rod 50 at two distinct points along the length of rod 50 at two distinct positions of control plate 49, control plate 49' is formed to engage rod 50' at three distinct points along the length of rod 50' at three distinct positions of control plate 49' identified in FIG. 6A as A, B, and C.

Position A of control plate 49' is the "on-line" position. At this position, control plate 49' engages the point end of rod 50' in a notch 49*a'*. Position B of control plate 49' is the "off-line" position. At this position, control plate 49' engages groove 50*a'* of rod 50' in a notch 49*b'* when the control plate is moved from position C to position B. Position C of control plate 49' is the added third position of control plate 49'. At this position, control plate 49' extends through a notch 49*c'* in the control plate.

The dot-dash line identified by reference numeral 54 represents the centerline of rod 50' relative to control plate 49' as the control plate is turned. Control plate 49' has a first radius defining a first peripheral edge 49*d'* extending between notches 49*a'* and 49*b'* and a second radius defining a second peripheral edge 49*e'* extending between notches 49*b'* and 49*c'*.

With control plate 49' in the "on-line" position (identified as A in FIG. 6A) and shearing baffle 30 in its DOWN position, the shoulder of the stepped lower end of rod 50' rests on the top of control plate 49' and the control plate engages the point end of the rod in notch 49*a'*. As with the interlocking means illustrated in FIGS. 5A, 5B and 5C, rod 50' is prevented from moving downward which, in turn, prevents upward movement of lever arm 34, so that shearing baffle 30 is prevented from moving to its UP position.

Control plate 49' and control valve 44 to which the control plate is fixed can be moved (counterclockwise for the control plate shown in FIG. 6A) position A to position B, so that first peripheral edge 49*d'* of the control plate moves past the point end of the rod. The shoulder of the stepped lower end of rod 50' continues to rest on the top of control plate 49' as the control plate is moved from position A to position B and the control plate continues to engage the point end of the rod because notch 49b' is not large enough to accommodate the larger diameter of rod 50'. Rod 50' still is prevented from moving downward which, in turn, prevents upward movement of lever arm 34, so that shearing baffle 30 is prevented from moving to its UP position.

Control plate 49' and control valve 44 to which the control plate is fixed can be moved (clockwise for the control plate shown in FIG. 6A) from position B to position A, so that first peripheral edge 49d' of the control plate moves past the point end of the rod and the control plate is returned to the "on-line" position. Control plate 49' and control valve 44 to which the control plate is fixed also can be moved (counterclockwise for the control plate shown in FIG. 6A) from position B to position C, so that second peripheral edge 49e' of the control plate moves past the point end of the rod. With control plate 49' in the third position at which no material is discharged from storage hopper 16 (identified as C in FIG. 6A), notch 49c' in the control plate is below rod 50' and the larger diameter of the rod now is free to move downward. Lever arm 34, coupled to rod 50', now can be moved upward and shearing baffle 30 can be moved from it DOWN position to its UP position. The downward movement of rod 50' brings circumferential groove 50a' of the rod into alignment with control plate 49'.

In this position of rod 50', control plate 49' passing through circumferential groove 50a' of rod 50' can only be turned (clockwise for the control plate shown in FIG. 6A) from position C to position B until the circumferential groove of the rod engages notch 49b'. With control plate 49' in circumferential groove 50a' of rod 50', shearing baffle 30 is locked in its UP position and cannot be returned to its DOWN position. Control plate 49' cannot be turned to the "on-line" position, thereby preventing control valve 44 from being switched to the "on-line" position while shearing baffle 30 is in its UP position.

Control plate 49', however, can be turned from the "off-line" position B to return to position C (counterclockwise for the control plate shown in FI 6A) at which no material is discharged from storage hopper 16. When control plate 49' is at position C, rod 50' is free to move upward when lever arm 34 is moved downward to return shearing baffle 34 to its DOWN position. Thus, when control plate 49' is turned from the "on-line" position A to the "off-line" position B for calibration of the materials feeding apparatus, shearing baffle 30 cannot be raised. After calibration is completed, control plate 49' can be returned to the "on-line" position A with shearing baffle 30 still in its DOWN position.

When control plate 49' is to be turned from the "on-line" position A to the "off-line" position B for unloading of storage hopper 16, the control plate must first be turned to position C to lift shearing baffle 30 to its UP position and then turned to the "off-line" position B. After storage hopper 16 has been unloaded and shearing baffle 30 is to be returned to its DOWN position, control plate 49' first must be turned to position C to permit lowering of the shearing baffle. Then control plate 49' can be turned (clockwise for the control plate shown in FIG. 6A) from position C through the "off-line" position B to the "on-line" position A.

While in the foregoing there have been described preferred embodiments of the present invention, it should be understood by those skilled in the art that various modifications and changes can be made without departing from the true spirit and scope of the present invention.

What is claimed:

1. Materials feeding apparatus for delivering material to utilization equipment, said apparatus comprising:

a storage hopper in which material is stored and having a floor with a material discharge opening extending through said floor;

a disc unit positioned within said storage hopper above said material discharge opening in said floor of said storage hopper and mounted for rotation in a plane at an angle to the horizontal for carrying material in said storage hopper to said material discharge opening;

drive means for imparting rotation to said disc unit;

a shearing baffle:
   (a) positioned above said disc unit at a predetermined distance from said disc unit for controlling the amount of material passing beneath said shearing baffle and carried by said disc unit to said material discharge opening in said floor of said storage hopper, and
   (b) mounted for movement to a position remote from said disc unit;

positioning means for moving said shearing baffle between said remote position and said position a predetermined distance from said disc unit;

a first delivery conduit for conducting material passing through said material discharge opening in said floor of said storage hopper to the utilization equipment;

a second delivery conduit for conducting material passing through said material discharge opening in said floor of said storage hopper to a storage container; and valve means for selectively connecting said first and said second delivery conduits to said material discharge opening in said floor of said storage hopper.

2. Materials feeding apparatus according to claim 1 further including interlocking means extending between said valve means and said positioning means for:

(a) preventing said positioning means from moving said shearing baffle from said position a predetermined distance from said disc unit to said remote position while said valve means connect said first delivery conduit to said material discharge opening in said floor of said storage hopper, and (b) preventing said valve means from connecting said first delivery conduit to said material discharge opening in said floor of said storage hopper while said shearing baffle is in said remote position.

3. Materials feeding apparatus according to claim 2 wherein said floor of said storage hopper is disposed at said angle to the horizontal and said material discharge opening in said floor of said storage hopper is at the lowest point of said floor.

4. Materials feeding apparatus according to claim 3 wherein said disc unit includes a disc having cavities extending through the thickness thereof within which the material is carried.

5. Materials feeding apparatus according to claim 3 wherein said disc unit includes a disc and an outer peripheral wall surrounding said disc and said disc has cavities extending through the thickness thereof within which the material is carried.

6. Materials feeding apparatus according to claim 5 wherein said cavities of said disc are spaced from said outer peripheral wall and open into the space between said disc and said outer peripheral wall.

7. Materials feeding apparatus according to claim 2 wherein said interlocking means include:

(a) a retainer plate movable with said positioning means, (b) a control plate fixed to and movable with said valve means, and (c) a rod having:
  (1) a first end attached to said retainer plate, and
  (2) a stepped second end engaging said control plate with the shoulder of said stepped second end resting on the top of said control plate and only a reduced diameter point end extending through said control plate when said control plate is at a first position and said rod extending through said control plate when said control plate is at a second position of said control plate.

8. Materials feeding apparatus according to claim 7 wherein said control plate has:

(a) a first notch through which only said reduced diameter point of said rod extends when said control plate is at said first position, and (b) a second notch through which said rod extends when said control plate is at said second position.

9. Materials feeding apparatus according to claim 2 wherein said positioning means include:

(a) a pivot pin attached to said storage hopper, (b) a lever arm pivotable about said pivot pin, and (c) a link attached at one end to said lever arm for relative rotational movement between said lever arm and said link and at its opposite end to said shearing baffle.

10. Materials feeding apparatus according to claim 2 wherein said interlocking means include:

(a) a retainer plate movable with said positioning means, (b) a control plate fixed to and movable with said valve means, and ( c ) a rod having:
  (1) a first end attached to said retainer plate,
  (2) a stepped second end engaging said control plate with the shoulder of said stepped second end resting on the top of said control and only a reduced diameter point end extending through said control plate when said control plate is at:
    (i) a first position, and
    (ii) a second position when said control plate has moved from said first position to said second position, and
  (c) a circumferential groove spaced from said reduced diameter point and having an internal diameter greater than the diameter of said reduced diameter point end engaging said control plate when said control plate is at:
    (i) a third position, and
    (ii) said second position of said control when said control plate has moved from said third position to said second position.

11. Materials feeding apparatus according to claim 10 wherein said control plate has:

(a) a first notch through which only said reduced diameter point of said rod extends when said control plate is at said first position, (b) a second notch through which only said reduced diameter point of said rod extends when said control plate has moved from said first position to said second position and engaged by said circumferential groove when said control plate has moved from said third position to said second position, and (c) a third notch through which said rod extends with said circumferential groove aligned with said control plate.

12. A materials blender comprising:

a first materials feeder for delivering a first constituent material of a blend and having:

(a) a storage hopper in which the first constituent material is stored and having a floor with a material discharge opening extending through said floor, (b) a disc unit positioned within said storage hopper above said material discharge opening in said floor of said storage hopper and mounted for rotation in a plane at an angle to the horizontal for carrying the first constituent material in said storage hopper to said material discharge opening, (c) drive means for imparting rotation to said disc unit, (d) a shearing baffle:
  (1) positioned above said disc unit at a predetermined distance from said disc unit for controlling the amount of the first constituent material passing beneath said shearing baffle and carried by said disc unit to said material discharge opening in said floor of said storage hopper, and
  (2) mounted for movement to a position remote from said disc unit, (e) positioning means for moving said shearing baffle between said remote position and said position a predetermined distance from said disc unit, (f) a first delivery conduit for conducting the first constituent material passing through said material discharge opening in said floor of said storage hopper to utilization equipment, (g) a second delivery conduit for conducting the first constituent material passing through said material discharge opening in said floor of said storage hopper to a storage container, and (h) valve means for selectively connecting said first and said second delivery conduits to said material discharge opening in said floor of said storage hopper;

a second materials feeder for delivering a second constituent material of a blend; and means for conducting said first constituent material conducted by said first delivery conduit of said first feeder and said second constituent material delivered by said second materials feeder to the utilization equipment.

13. A materials blender according to claim 12 further including interlocking means in said first materials feeder extending between said valve means in said first materials feeder and said positioning means in said first materials feeder for:

(a) preventing said positioning means from moving said shearing baffle in said first materials feeder from said position a predetermined distance from said disc unit in said first materials feeder to said remote position while said valve means connect said first delivery conduit in said first materials feeder to said material discharge opening in said floor of said storage hopper in said first materials feeder, and (b) preventing said valve means from connecting said first delivery conduit to said material discharge opening in said floor of said storage hopper while said shearing baffle is in said remote position.

14. A materials blender according to claim 13 wherein said disc unit in said first materials feeder includes a disc having cavities extending through the thickness thereof within which the first constituent material is carried.

15. A materials blender according to claim 13 wherein said interlocking means in said first materials feeder include:
  (a) a retainer plate movable with said positioning means in said first materials feeder,
  (b) a control plate fixed to and movable with said valve means in said first materials feeder, and
  (c) a rod having:
    (1) a first end attached to said retainer plate, and
    (2) a stepped second end engaging said control plate with the shoulder of said stepped second end resting on the top of said control plate and only a reduced diameter point end extending through said control plate when said control plate is at a first position and said rod extending through said control plate when said control plate is at a second position.

16. A materials blender according to claim 15 wherein said control plate has:
  (a) a first notch through which only said reduced diameter point of said rod extends when said control plate is at said first position, and
  (b) a second notch through which said rod extends when said control plate is at said second position.

17. A materials blender according to claim 15 wherein said interlocking means include:
  (a) a retainer plate movable with said positioning means,
  (b) a control plate fixed to and movable with said valve means, and
  (c) a rod having:
    (1) a first end attached to said retainer plate,
    (2) a stepped second end engaging said control plate with the shoulder of said stepped second end resting on the top of said control and only a reduced diameter point ending extending through said control plate when said control plate is at:
      (i) a first position, and
      (ii) a second position when said control plate has moved from said first position to said second position, and
    (c) a circumferential groove spaced from said reduced diameter point and having an internal diameter greater than the diameter of said reduced diameter point end engaging said control plate when said control plate is at:
      (i) a third position, and
      (ii) said second position of said control when said control plate has moved from said third position to said second position.

18. A materials blender according to claim 17 wherein said control plate has:
  (a) a first notch through which only said reduced diameter point of said rod extends when said control plate is at said first position,
  (b) a second notch through which only said reduced diameter point of said rod extends when said control plate has moved from said first position to said second position and engaged by said circumferential groove when said control plate has moved from said third position to said second position, and
  (c) a third notch through which said rod extends with said circumferential groove aligned with said control plate.

19. A materials blender according to claim 12 wherein said floor of said storage hopper in said first materials feeder is disposed at said angle to the horizontal and said material discharge opening in said floor of said storage hopper is at the lowest point of said floor.

20. A materials blender according to claim 19 wherein said disc unit in said first materials feeder includes a disc and an outer peripheral wall surrounding said disc and said disc has cavities extending through the thickness thereof within which the first constituent material is carried.

21. A materials blender according to claim 20 wherein said cavities of said disc in said first materials feeder are spaced from said outer peripheral wall in said first materials feeder and open into the space between said disc and said outer peripheral wall.

22. A materials blender according to claim 12 wherein said positioning means in said first materials feeder include:
  (a) a pivot pin attached to said storage hopper in said first materials feeder,
  (b) a lever arm pivotable about said pivot pin, and
  (c) a link attached at one end to said lever arm for relative rotational movement between said lever arm and said link and at its opposite end to said shearing baffle in said first materials feeder.

* * * * *